Aug. 3, 1948.    W. G. HARDING    2,446,281
CORRUGATED TUBE MANUFACTURE
Filed May 11, 1944    2 Sheets-Sheet 1
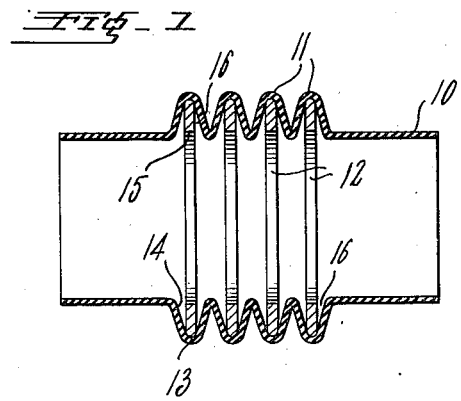
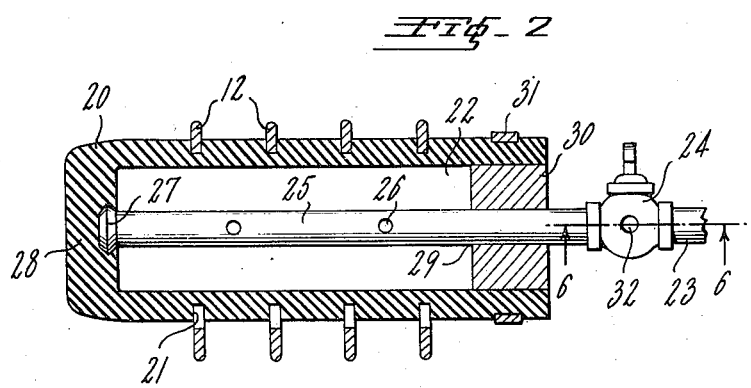
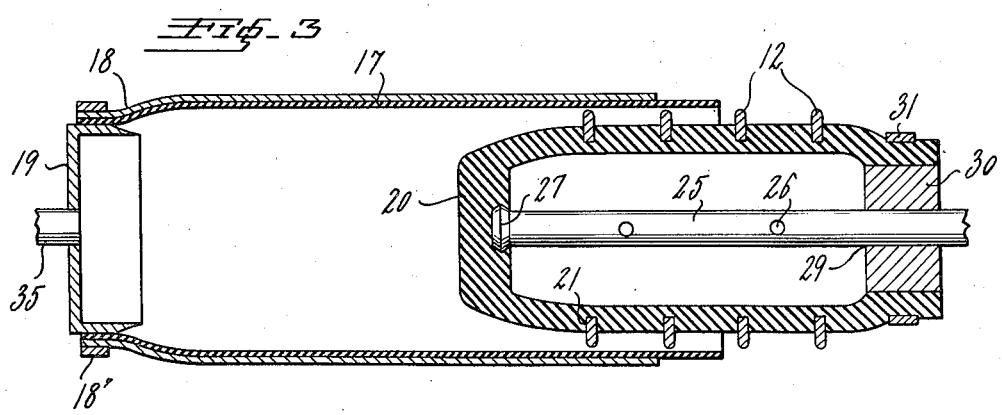
INVENTOR.
WATSON G. HARDING
BY Lester G. Buellog
ATTORNEY Aug. 3, 1948.   W. G. HARDING   2,446,281
CORRUGATED TUBE MANUFACTURE
Filed May 11, 1944   2 Sheets-Sheet 2

INVENTOR.
WATSON G. HARDING
BY Lester J. Budlong
ATTORNEY

Patented Aug. 3, 1948

2,446,281

UNITED STATES PATENT OFFICE 2,446,281

CORRUGATED TUBE MANUFACTURE

Watson G. Harding, Ridgewood, N. J., assignor to United States Rubber Company, New York, N. Y., a corporation of New Jersey Application May 11, 1944, Serial No. 535,112

8 Claims. (Cl. 18—19)

This invention relates to an improved method and apparatus for making internally reinforced flexible corrugated tubes, having annular corrugations reinforced with rings positioned within the interior valleys of the corrugations.

Corrugated tubes are made from deformable plastic treated textile fabric tubular casings which are subsequently corrugated. In accordance with my invention reinforcing rings are placed in the interior of such deformable tubular casings in spaced relation to each other, with the peripheries of the rings in contact with the casings. The casings are then collapsed longitudinally to produce a corrugated tube having the improved combined qualities of flexibility and resistance to external pressure. The use of the apparatus and method has the further advantage of increasing the rate of production of tubes over methods heretofore employed.

This invention is further described in reference to the accompanying drawings, in which:

Fig. 1 is a longitudinal cross-section of a corrugated tube made by my improved method and apparatus;

Fig. 2 is a longitudinal cross-sectional view of an element of my invention comprising an inflatable mandrel used to insert reinforcing rings within the tube to be corrugated;

Fig. 3 is a longitudinal cross-section of the mandrel shown in Fig. 2 after it has been inflated to secure the reinforcing rings thereon, and of a related portion of the apparatus, illustrating the method of assembly of the reinforcing rings within the tube;

Fig. 5 is a cross-sectional view of the valve shown in Fig. 4 taken on line 5—5;

Fig. 6 is a cross-sectional view of the valve shown in Fig. 5 taken on line 6—6 of Fig. 2, and illustrating the valve in its exhaust position;

Figure 4:
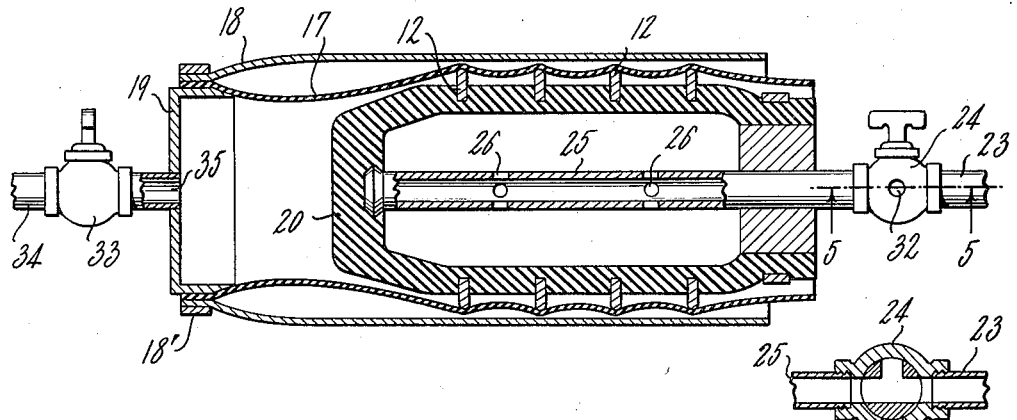
Fig. 4 is a longitudinal cross-sectional view of the parts of the apparatus shown in Fig. 3, but shown in another position illustrating the method of making the tube.

An article made by the use of my method and apparatus is shown in Fig. 1 of the drawings, and it comprises a corrugated tube 10 having annular corrugations 11 in which are located supporting or reinforcing members in the form of rings 12. The rings 12 are made of a relatively rigid material and their annuli are preferably in one solid piece, that is they are undivided. The outer peripheries 13 of the rings engage and support the interior surface 14 of the corrugations 11 at their greatest diameter. The inner peripheries 15 of the rings 12 project within the interior valleys 16 of the corrugations 11. The corrugated tube 10 and its walls are flexible and the rings increase the resistance of the walls against being radially collapsed by the exterior application of pressure in the radial direction, and without substantially decreasing the flexibility of the tube in respect to axial bending movements and elongation. The tube is preferably made of a textile fabric impregnated or coated with a flexible material to render it impervious to gases and liquids. Such impregnating or coating materials may be rubber, or rubber compositions, or synthetic plastics, which can be treated after the tube has been shaped to cause the shape to be retained. The tube may also be made from rubber or rubber compositions or other synthetic materials which will provide the necessary flexibility and strength after being set as by vulcanization, or other treatment.

The method and apparatus for manufacturing the tube is disclosed in Figs. 2 to 8, inclusive. The tube 10, in its initial stage before being corrugated, has a smooth outer surface, and it is adapted to be deformed into the desired shape by stretching it radially, and collapsing it longitudinally. In the practice of the method as shown in Fig. 3, tube 17, to be corrugated from its initial stage, is enclosed within a retaining tube 18 which latter may be made of canvas and provided with a reinforcing band 18'. One end of the tube 17 is clamped between an air nozzle 19 and the adjacent end of the tube 18.

Referring to Fig. 2, the rings 12 are inserted in the tube 17 by securing them on an inflatable mandrel 20. The external diameter of the mandrel is smaller than the internal diameter of the rings 12, and it is provided with axially spaced annular grooves 21 which are adapted to receive the internal periphery of the rings 12. After the rings are placed upon the mandrel, the latter is expanded radially by admitting fluid under pressure to its internal cavity 22 from a supply pipe 23, and the pressure expands the mandrel to the position as shown in Fig. 3 so as to securely hold the rings 12 in place, but before the mandrel is inserted in the tube 17. The fluid pressure is controlled by a valve 24 which is adapted to admit the pressure from the pipe 23 to the pipe 25 which extends into the mandrel 20. The fluid is discharged into the mandrel through the openings 26 in the pipe 25. Preferably the inner end 27 of the pipe 25 is anchored in the end 28 of the mandrel 20 in order to give greater rigidity thereto and to prevent it from extending longitudinally when inflated. The end of the pipe 25 adjacent to the valve 24 extends through and is sealed in a bore 29 in a plug 30 in the end of the mandrel 20. The plug 30 is held in sealed relation with the mandrel 20 by means of an external clamping ring 31.

The valve 24 is so constructed that it can admit fluid pressure from the pipe 23 to the pipe 25 in one of its positions, and so that it can cut off the fluid pressure from the pipe 23 and discharge the fluid pressure from the pipe 25 to the atmosphere through the discharge outlet 32. As shown in Fig. 2, the valve 24 is in its position to cut off the fluid pressure from the pipe 23 and discharge it from the pipe 25. A cross-section of the valve in this position is shown in Fig. 6 of the drawings. In order to inflate the mandrel 20 and expand it radially to secure the rings 12 thereon, the valve 24 is turned to its admitting position, as shown in Fig. 5.

The rings 12 having been secured on the mandrel 20, air under pressure is now admitted through the nozzle 19 into the interior of the tube 17, and the mandrel 20 with the rings 12 thereon is inserted in the end of the tube 17. The tube 17 is initially smaller than the rings, but the built up air pressure within the tube 17 causes it to expand radially to permit the rings 12 to be inserted and positioned therein as shown in Fig. 4. During the ring inserting operation the tube 17 may be expanded against the retaining tube 18 and the latter will prevent the tube 17 from being strained. The air escapes from the free end of the tube 17, between it and the outer diameter of the rings 12, and thereby provides a cushion or film of air between the rings and the interior walls of the tube 17. This cushion of air permits the mandrel 20 to be easily inserted within the tube 17.

Figure 7:
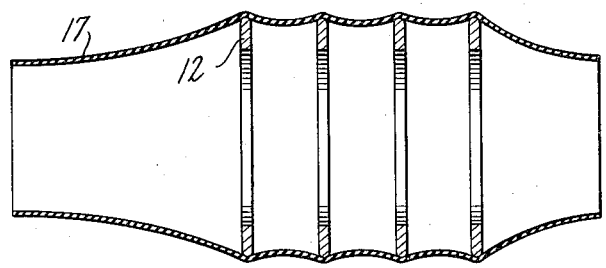
Fig. 7 is a longitudinal cross-section of the tube to be corrugated, and showing the reinforcing rings inserted therein.

As shown in Fig. 4, a cut-off valve 33 is inserted in the air supply pipe 34 leading to the nozzle 19 to control the supply of air to the outlet 35 of the nozzle. During the inserting movement of the mandrel, the valve 33 is in its on position and admits the air to the tube 17, but the valve, as shown in Fig. 4, has been turned to its off position in order to cut off the air supply and permit the tube 17 to contract radially and tightly engage the outer diameters of the rings 12. This being done, the mandrel valve 24 is turned to its exhaust position, as shown in Fig. 6 so as to permit the mandrel 20 to contract radially to the position shown in Fig. 2. In such position the rings 12 are released from the mandrel 20, and as they are now tightly engaged by the inner walls of the tube 17 the mandrel may be disengaged from the rings 12 and removed from the interior of the tube 17. The mandrel is removed and the rings 12 are retained in the tube 17, as illustrated in Fig. 7.

Figure 8:
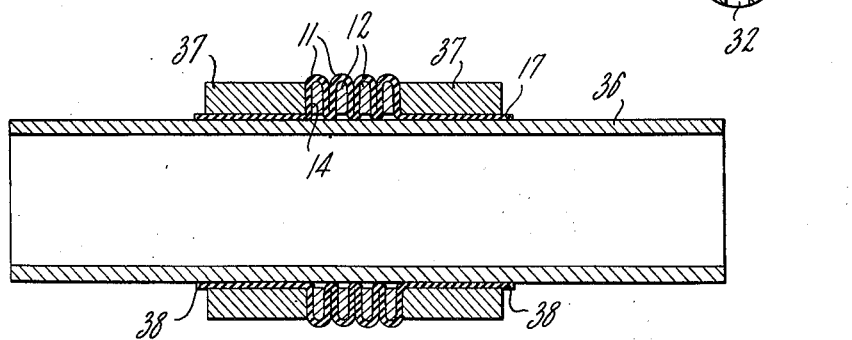
Fig. 8 is a longitudinal cross-sectional view of a mandrel showing the tube corrugated thereon.

The nozzle 19 is then removed from the end of the tube 17 to release it, and the tube with the rings 12 therein is then removed from the retaining tube 18. The tube 17 will then present the shape as shown in Fig. 7. The tube 17 with the rings gripped thereby is then placed upon the mandrel 36 (Fig. 8). Rings 37 are slipped over the smooth ends 38 of the tube 17 in close engagement therewith. The rings 37 are then moved towards each other into the position as shown in Fig. 8. Such movement causes the tube 17 to collapse longitudinally and form the corrugations 11 with the rings 12 secured in the interior valleys 16 of the corrugations. While the tube 17 is retained in that position, it is treated so that the corrugations will be retained in the tube 17 after it has been removed from the mandrel 36 and released from the endwise pressure. Such treatment may involve retaining the tube in the position shown in Fig. 8 for sufficient length of time so that it will be permanently set, or if the tube contains a thermosetting material it may be subjected to heat to produce the permanent set, or if the tube contains a plastic plasticiser it may be set by evaporating the plasticiser, as is well known in the art. After the tube 17 has been so treated, the rings 37 and the mandrel 36 are removed therefrom. The tube 17 will then be converted into the tube 10 as shown in Fig. 1 of the drawings, or it may retain its shape as shown in Fig. 8, depending upon how tightly the corrugations have been pushed together and how permanently the tube has been set.

While I have described this invention more or less in detail, it may be understood that changes may be made therein without departing from the spirit of the invention and the scope of the appended claims.

Having thus described my invention, what I claim and desire to protect by Letters Patent is:

1. Method of making an internally reinforced corrugated tube comprising the steps of inserting rings in a deformable tube in spaced relation to one another and with their outside diameters in tight contact with the inside surface of said tube, and forcing said rings towards each other along the axis of said tube so as to collapse the walls of said tube inwardly between said rings and permanently secure said rings therein.

2. The method of making an internally reinforced corrugated tube comprising the steps of expanding the circumference of a deformable tube, inserting rings in the expanded tube in spaced relation to one another and with their outside circumferences in contact with the inner surface of said tube, forcing said rings towards each other along the axis of said tube so as to collapse the walls of said tubes inwardly between said rings and permanently secure said rings therein.

3. The method of making a corrugated tube comprising the steps of expanding the circumference of a deformable tube under fluid pressure, inserting rings in the expanded tube in spaced relation to one another and with their outside diameters in contact with the inner surface of said tube, releasing said pressure, and forcing said rings towards each other along the axis of said tube so as to collapse the walls of said tubes inwardly between said rings.

4. The method of making an internally reinforced corrugated tube comprising the steps of stretching a plastic vulcanizable rubber tube circumferentially, inserting rings within said stretched tube in spaced relation to one another and with their outside circumferences in tight contact with the inner surface of said tube, forcing said rings towards each other along the axis of said tube so as to collapse the walls of said tubes inwardly between said rings, and permanently retaining the rings therein by vulcanizing said tubes so as to retain the corrugated condition of said tube.

5. The method of making a corrugated tube comprising the steps of inflating a plastic vulcanizable rubber tube within and against the inner walls of a fabric tube under fluid pressure and stretching said rubber tube circumferentially, inserting rings within said stretched tube in spaced axial relation to one another and with their outside diameters in tight contact with the inner surface of said tube, releasing said pressure, forcing said rings towards each other along the axis of said tube so as to collapse the walls of said tubes inwardly between said rings, and vulcanizing said tubes so as to retain the corrugated condition of said tube.

6. In an apparatus for making corrugated tubes, comprising means for diametrically expanding an elastic tube and subsequently permitting said tube to contract, a mandrel adapted to insert rigid rings in said expanded tube, said mandrel comprising means for retaining said rings in spaced relation thereon, and means cooperating with said mandrel for releasing said rings in contact with said contracted tube.

7. A mandrel for inserting rings in axially spaced relation within a tube, said mandrel comprising an inflatable elastic cylindrical mandrel, said mandrel having means thereon for locating said rings in axially spaced relation while said mandrel is deflated, and means for inflating said mandrel and expanding same diametrically to retain said rings in place.

8. A mandrel for inserting rings in axially spaced relation within a tube, said mandrel comprising an inflatable elastic cylindrical mandrel, said mandrel having means thereon for locating said rings in axially spaced relation while said mandrel is deflated, and means for maintaining the length of said mandrel substantially constant while said mandrel is deflated and inflated.

WATSON G. HARDING.

REFERENCES CITED

The following references are of record in the file of this patent:

UNITED STATES PATENTS

| Number | Name | Date |
| --- | --- | --- |
| 24,222 | Burney | May 31, 1859 |
| 2,039,781 | Debenedetti | May 5, 1936 |
| 2,347,086 | Curtiss et al. | Apr. 18, 1944 |
| 2,347,101 | Harding | Apr. 18, 1944 |